(12) United States Patent
Osamura et al.

(10) Patent No.: US 10,889,170 B2
(45) Date of Patent: Jan. 12, 2021

(54) DEFLECTOR DEVICE AND ROTATION BIASING DEVICE

(71) Applicant: AISIN SEIKI KABUSHIKI KAISHA, Kariya (JP)

(72) Inventors: Akinori Osamura, Chiryu (JP); Ryuta Fukada, Kariya (JP); Aisei Kawazu, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 16/381,703

(22) Filed: Apr. 11, 2019

(65) Prior Publication Data

US 2019/0315212 A1    Oct. 17, 2019

(30) Foreign Application Priority Data

Apr. 13, 2018 (JP) ................................. 2018-077576

(51) Int. Cl.
*B60J 7/22* (2006.01)
*B60J 7/043* (2006.01)

(52) U.S. Cl.
CPC ........ *B60J 7/22* (2013.01); *B60J 7/043* (2013.01)

(58) Field of Classification Search
CPC ........................................................ B60J 7/22
USPC ........................................................ 296/217
See application file for complete search history.

(56) References Cited

U.S. PATENT DOCUMENTS

| 9,186,971 | B1 * | 11/2015 | Lee | B60J 7/22 |
|---|---|---|---|---|
| 10,245,930 | B2 * | 4/2019 | Shoji | B60J 7/22 |
| 2010/0327624 | A1 * | 12/2010 | Wetzels | B60J 7/22 |
| | | | | 296/180.1 |
| 2014/0284969 | A1 | 9/2014 | Hiramatsu | |

FOREIGN PATENT DOCUMENTS

JP    2014-180999    9/2014

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A deflector device includes a deflector that is arranged at a front edge portion of a roof opening portion, an arm that supports the deflector, a holder that rotatably supports the arm, and a spring member that is interposed between the holder and the arm and thereby rotationally biases the arm in a direction in which the deflector is spread. To the holder, an engaging piece that has a claw portion engaging with an edge portion of a mounting hole formed at a fixing position (a support surface of a base member) at which the holder is fixed is disposed. To the engaging piece, a pressed portion against which the spring member pressing the holder is pressed and that thereby reinforces an engagement state of the claw portion with the edge portion of the mounting hole is disposed.

13 Claims, 6 Drawing Sheets

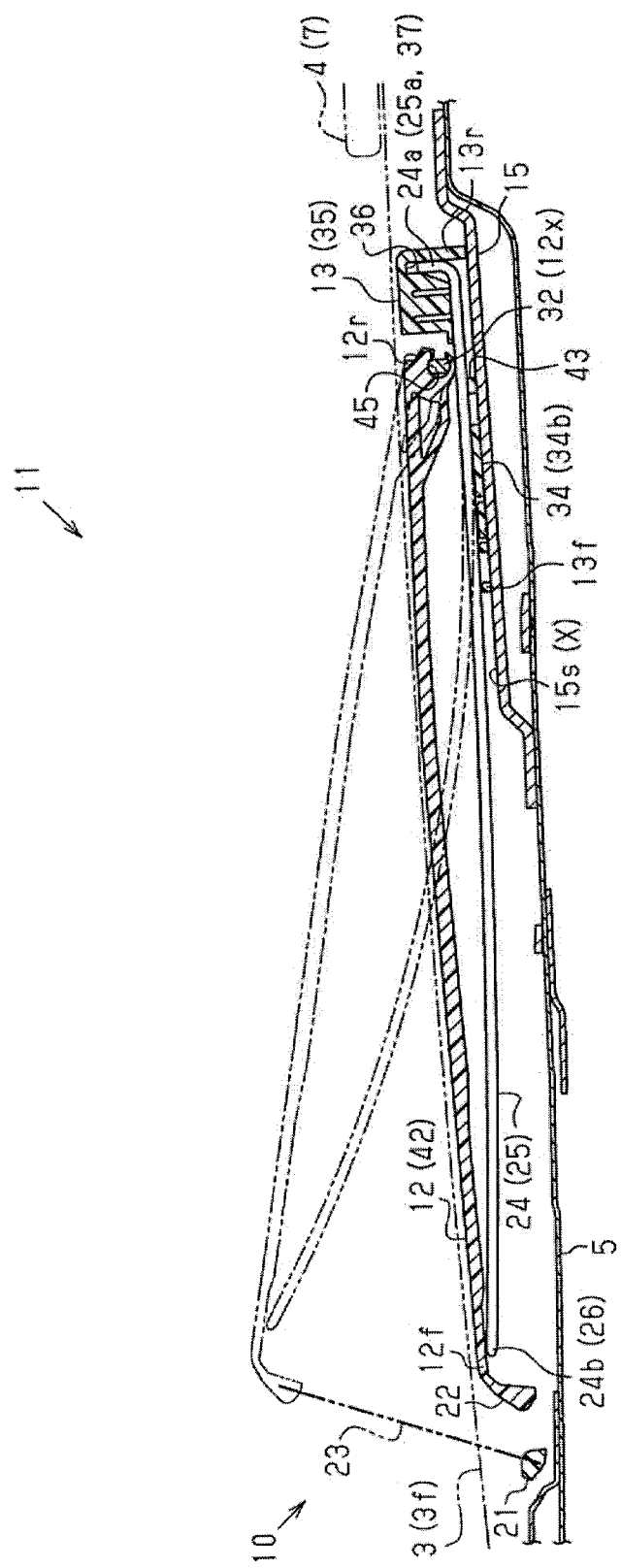

DEFLECTOR DEVICE AND ROTATION BIASING DEVICE

CROSS REFERENCE TO RELATED APPLICATIONS

This application is based on and claims priority under 35 U.S.C. § 119 to Japanese Patent Application 2018-077576, filed on Apr. 13, 2018, the entire content of which is incorporated herein by reference.

TECHNICAL FIELD

This disclosure generally relates to a deflector device and a rotation biasing device.

BACKGROUND DISCUSSION

Conventionally, deflector devices for vehicles include a deflector device that, based on an elastic force of a spring member, spreads a deflector at a front edge portion of an opening portion (roof opening portion) disposed to the roof of the vehicle. For example, a deflector device described in JP 2014-180999 A (Reference 1) includes arms that support a deflector at a front edge portion of a roof opening portion. The arms are rotatably coupled to mounting portions formed on guide rails of a sunroof device that opens and closes the roof opening portion. Further, the deflector device includes spring members that are interposed between the arms and the guide rails and thereby rotationally bias the arms. With this configuration, the deflector device is configured to spread the deflector supported by the arms, at the front edge portion of the roof opening portion.

However, when the configuration of the conventional technology described above is employed, assembling work of the deflector device, such as attachment of the arms to the mounting portions formed on the guide rails and interposition of the spring members, is complicated. Since this complicatedness becomes a cause for increase in manufacturing cost, room for improvement has been left in terms of this point.

A need thus exists for a deflector device and a rotation biasing device which are not susceptible to the drawback mentioned above.

SUMMARY

A deflector device includes a deflector arranged at a front edge portion of an opening portion disposed to a roof of a vehicle, an arm that supports the deflector, a holder that rotatably supports the arm, and a spring member that is interposed between the holder and the arm and thereby rotationally biases the arm in a direction in which the deflector is spread at a front edge portion of the opening portion. An engaging piece that has a claw portion engaging with an edge portion of a mounting hole formed at a fixing position at which the holder is fixed is disposed to the holder, and a pressed portion against which the spring member pressing the holder is pressed and that thereby reinforces an engagement state of the claw portion with an edge portion of the mounting hole is disposed to the engaging piece.

A rotation biasing device includes a holder that supports a rotating member and a spring member that is interposed between the holder and the rotating member and thereby rotationally biases the rotating member. An engaging piece that has a claw portion engaging with an edge portion of a mounting hole formed at a fixing position at which the holder is fixed is disposed to the holder, and a pressed portion against which the spring member pressing the holder is pressed and that thereby reinforces an engagement state of the claw portion with an edge portion of the mounting hole is disposed to the engaging piece.

According to an aspect of this disclosure, it is possible to secure an easy-to-assemble and stable fixation state.

BRIEF DESCRIPTION OF THE DRAWINGS

The foregoing and additional features and characteristics of this disclosure will become more apparent from the following detailed description considered with the reference to the accompanying drawings, wherein:

FIG. 4 is a cross-sectional view of the deflector device (a cross-sectional view taken along a line IV-IV in FIG. 2);

DETAILED DESCRIPTION

An embodiment of a deflector device disclosed here will be explained with reference to the attached drawings.

Figure 1:
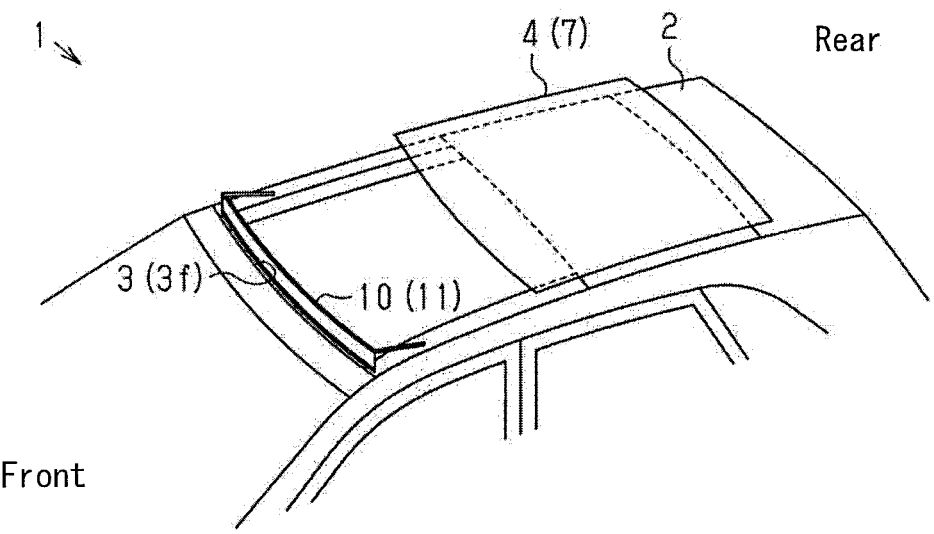
FIG. 1 is a perspective view of a sunroof device and a deflector device disposed to a roof opening portion.
Figure 2:
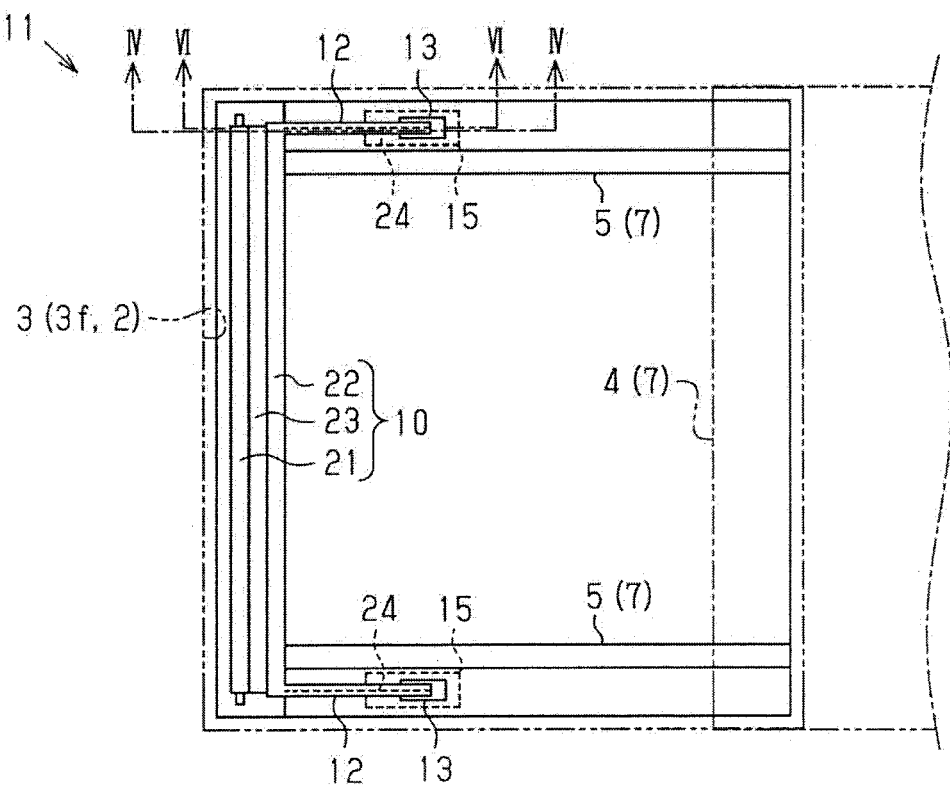
FIG. 2 is a schematic configuration diagram of the sunroof device and the deflector device.

As illustrated in FIGS. 1 and 2, to an opening portion (a roof opening portion 3) formed to a roof 2 of a vehicle 1, a movable panel 4 capable of opening and closing the roof opening portion 3 is disposed. Specifically, in the vehicle 1 of the embodiment, a pair of guide rails 5 that extend in a vehicle longitudinal direction at both sides in the width direction are disposed inside the roof opening portion 3. The vehicle 1 of the embodiment includes a sunroof device 7 that causes the movable panel 4 to perform opening and closing movement along the pair of guide rails 5.

To the vehicle 1 of the embodiment, a deflector device 11 that spreads a deflector 10 is disposed at a front edge portion 3f of the roof opening portion 3. With this configuration, the vehicle 1 of the embodiment is configured to suppress entrainment of travel wind into the roof opening portion 3 that is opened by operation of the sunroof device 7.

Figure 3:
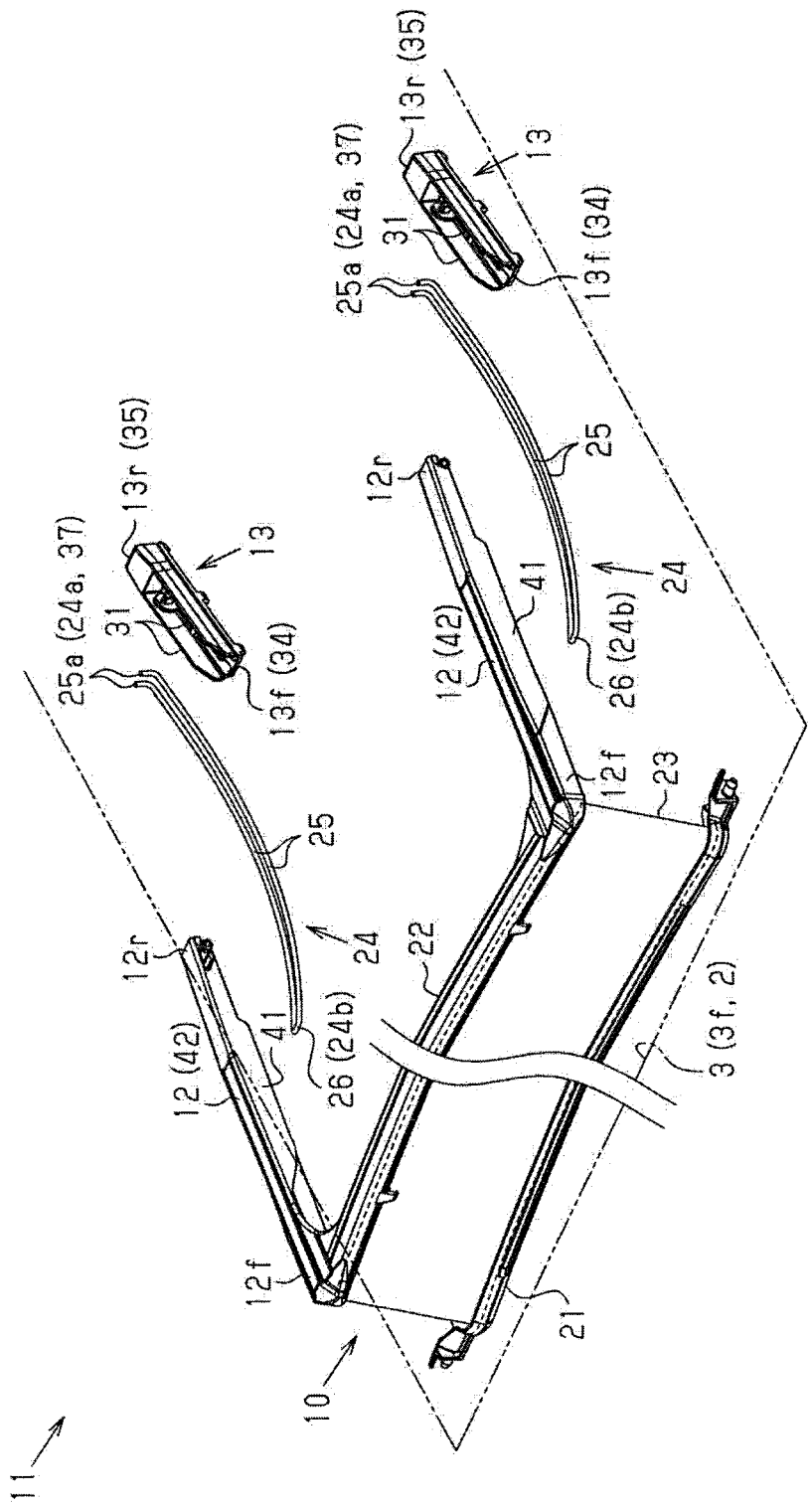
FIG. 3 is an exploded perspective view of the deflector device.

More specifically, as illustrated in FIGS. 2 to 4, the deflector device 11 of the embodiment includes a pair of arms 12 that extend from both end portions in a longitudinal direction of the deflector 10 which extends in the vehicle width direction (an up-and-down direction in FIG. 2 and a direction orthogonal to the paper surface in FIG. 4) at the front edge portion 3f of the roof opening portion 3, toward a vehicle rear side (a right side in FIGS. 2 and 4). The deflector device 11 also includes a pair of holders 13 that rotatably support the respective arms 12. Further, each of the holders 13 is fixed to a base member (bracket) 15 disposed to the guide rail 5, inside the roof opening portion 3. With this configuration, the deflector device 11 of the embodiment is configured to spread and retract the deflector 10 at the front edge portion 3f of the roof opening portion 3, based on rotation of the arms 12.

Further more specifically, the deflector 10 of the embodiment includes a lower frame 21 that, while extending in the vehicle width direction, is fixed to the front edge portion 3f of the roof opening portion 3. The deflector 10 also includes an upper frame 22 that, while extending in the vehicle width direction, is arranged at the front edge portion 3f of the roof opening portion 3. Further, in the deflector 10 of the embodiment, the upper frame 22 is formed in one body with the arms 12 in such a way that both end portions in a longitudinal direction of the upper frame 22 respectively continue to front edge portions 12f of the above-described arms 12. The deflector 10 of the embodiment is configured including a belt-shaped mesh member 23 that, while being hung between the upper frame 22 and the lower frame 21, extends in the vehicle width direction.

In other words, the deflector 10 of the embodiment is spread in such a way that the upper frame 22 which integrally rotates with the arms 12 pulls out the mesh member 23 upward. The deflector 10 is configured to be retracted in such a way that downward movement of the upper frame 22 folds the mesh member 23.

The deflector device 11 of the embodiment includes a pair of spring members 24 interposed between the respective arms 12 and the respective holders 13. Specifically, the spring members 24 are respectively disposed in a state of pressing the arms 12 and the holders 13. Further, each of the arms 12 of the embodiment is rotationally biased in a direction in which the front edge portion 12f side thereof is lifted upward (a clockwise direction in FIG. 4), based on an elastic force of each of the spring members 24. With this configuration, the deflector device 11 of the embodiment is configured in such a way that upward movement of the upper frame 22 formed in one body with the arms 12 causes the deflector 10 to be spread at the front edge portion 3f of the roof opening portion 3.

Further, the deflector device 11 of the embodiment is configured in such a way that, when closing movement of the sunroof device 7 causes the movable panel 4 to move to a full close position, the arms 12 and the upper frame 22 are pushed downward by the movable panel 4. With this configuration, the vehicle 1 of the embodiment is configured in such a way that, when the movable panel 4 is positioned at the full close position, the deflector 10 is in a retracted state and held at the front edge portion 3f of the roof opening portion 3, and, in conjunction therewith, movement of the movable panel 4 in an opening direction because of operation of the sunroof device 7 causes the deflector 10 to be spread at the front edge portion 3f of the roof opening portion 3.

(Spring Member and Holder, and Fixing Structure of Holder)

Next, the spring members 24 and the holders 13 which constitute the deflector device 11 of the embodiment, and a fixing structure of the holders 13 will be explained.

As illustrated in FIGS. 3 and 4, the spring member 24 of the embodiment has a pair of wire spring portions 25 that, while being interposed between the arm 12 and the holder 13, extend in an extending direction of the arm 12. Specifically, the spring member 24 of the embodiment is formed by bending a wire rod into two. The spring member 24 is interposed between the arm 12 and the holder 13 with a first end portion 24a side in a longitudinal direction thereof, at which open ends 25a of the wire spring portions 25 are formed, being locked to the holder 13, and, therewith, a second end portion 24b side in the longitudinal direction thereof, at which a bent portion 26 that connects the wire spring portions 25 and is substantially U-shaped is formed, coming into contact with the arm 12. Further, the spring member 24 is formed in an arcuate curved shape a middle portion of which in the longitudinal direction is spaced apart from the arm 12. The deflector device 11 of the embodiment is configured to, based on an elastic force generated by bending of the curved shape of the arcuate spring member 24, rotationally bias the arm 12 supported by the holder 13 in a spreading direction, that is, a direction in which the deflector 10 supported by the arms 12 at the front end portions 12f is spread at the front edge portion 3f of the roof opening portion 3 (a clockwise direction in FIG. 4).

More specifically, as illustrated in FIGS. 5A, 5B, 6, and 7, the holder 13 of the embodiment includes a pair of sidewall portions 31 facing each other. In the holder 13 of the embodiment, each of the sidewall portions 31 has a substantially rectangular flat plate-shaped outer shape that extends in the extending direction of the arm 12. The holder 13 of the embodiment also includes a pair of shaft-shaped projecting portions 32 disposed at positions facing each other on the respective sidewall portions 31. The holder 13 of the embodiment is configured to support the arm 12 about a rotation axis 12x that the shaft-shaped projecting portions 32 form.

Further more specifically, the holder 13 of the embodiment includes a bottom wall portion 34 that connects between the respective sidewall portions 31 on one end side in a transverse direction of the sidewall portions 31. The holder 13 also includes a box-shaped portion 35 disposed on one end side in a longitudinal direction (a right side in FIGS. 5A and 5B) of the sidewall portions 31 in such a way as to be sandwiched between the respective sidewall portions 31. Further, the holder 13 is configured in such a way that fixation thereof to the base member 15 disposed inside the roof opening portion 3 with the bottom wall portion 34 thereof facing downward causes the box-shaped portion 35 thereof to be arranged on the vehicle rear side (see FIG. 2, a right side in FIG. 2) further than the shaft-shaped projecting portions 32 which form the rotation axis 12x of the arm 12. The spring member 24 of the embodiment is configured to have the first end portion 24a in the longitudinal direction thereof being locked to the box-shaped portion 35.

Specifically, as illustrated in FIG. 4, in the holder 13 of the embodiment, locking holes 36 that open downward (toward a lower side in FIG. 4) are disposed to the box-shaped portion 35. Further, the spring member 24 of the embodiment has the open ends 25a of the wire spring portions 25 which constitute the first end portion 24a in the longitudinal direction of the spring member 24, being formed into substantially L-shaped bent portions 37. The spring member 24 of the embodiment is configured to, through insertion of the bent portions 37 into the locking holes 36 of the box-shaped portion 35, be assembled to the holder 13 with the two wire spring portions 25 arranged substantially in parallel with each other, being disposed along the bottom wall portion 34.

The spring member 24 of the embodiment is also configured in such a way that locking of the first end portion 24a side in the longitudinal direction thereof to the holder 13 in this manner causes the second end portion 24b side thereof to warp toward the arm 12 positioned on the upper side, based on the arcuate curved shape of the spring member 24. With this configuration, the spring member 24 of the embodiment is configured to have the substantially U-shaped bent portion 26 constituting the second end portion 24b in the longitudinal direction of the spring member 24, coming into contact with the arm 12.

Specifically, as illustrated in FIG. 3, the arm 12 of the embodiment includes a pair of sidewall portions 41 facing each other and an upper wall portion 42 that connects between the respective sidewall portions 41. Further, the spring member 24 of the embodiment is configured to, when the deflector device 11 is in a state of being mounted on the roof 2 of the vehicle 1, have the second end portion 24b in the longitudinal direction thereof being inserted into the substantially U-shaped cross-sectional shape of the arm 12 which opens downward. As illustrated in FIG. 4, with this configuration, the spring member 24 of the embodiment is configured to have the substantially U-shaped bent portion 26 disposed at the second end portion 24b in the longitudinal direction thereof, coming into contact with the upper wall portion 42 of the arm 12 in a slidable manner along the longitudinal direction.

In other words, the spring member 24 of the embodiment, by being caused by rotation of the arm 12 in a direction in which the deflector 10 supported at the front end portion 12f is retracted (an anti-clockwise direction in FIG. 4), elastically deforms in such a way as to stretch the arcuate curved shape of the spring member 24 while moving the contact point with the arm 12 toward the front end portion 12f side of the arm 12. The spring member 24 of the embodiment rotationally biases the arm 12 while moving the contact point with the arm 12 toward a rear end portion 12r of the arm 12, based on an elastic force (elastic restoring force) generated when the stretched arcuate curved shape seeks to contract again. With this configuration, the deflector device 11 of the embodiment is configured to spread the deflector 10 supported at the front end portion 12f of the arm 12, upward.

Figure 5A:
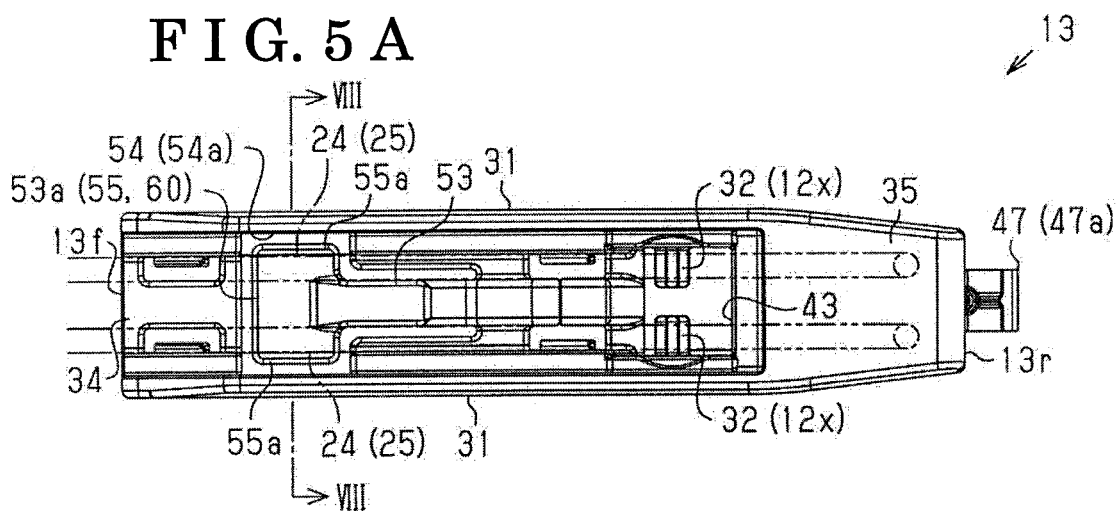
FIGS. 5A and 5B are a plan view and a side view of a holder, respectively.
Figure 5B:
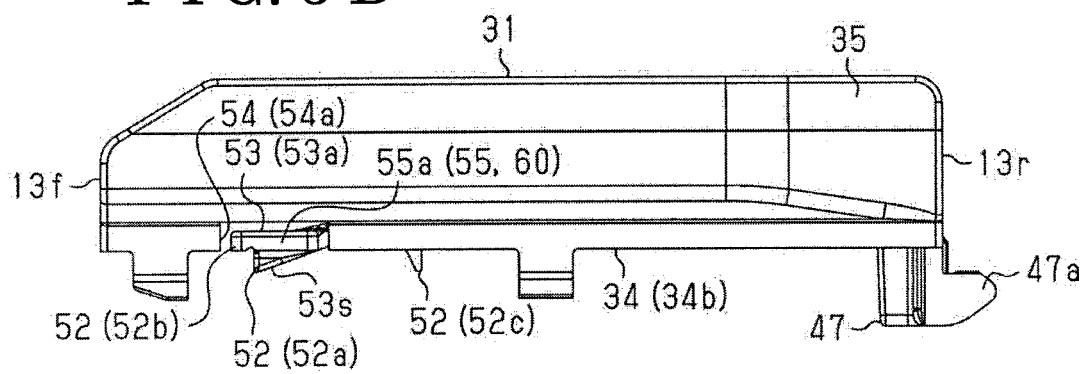

As illustrated in FIGS. 5A and 5B, the holder 13 of the embodiment has a hole portion 43 disposed to the bottom wall portion 34 at a position underneath the shaft-shaped projecting portions 32 which form the rotation axis 12x of the arm 12. The spring member 24 of the embodiment is assembled to the holder 13 in such a way that the second end portion 24b in the longitudinal direction of the spring member 24 is inserted into the hole portion 43 from the underside surface 34b side of the bottom wall portion 34. Further, in the deflector device 11 of the embodiment, the spring member 24 inserted into the hole portion 43 is rotated about the shaft-shaped projecting portions 32. With this configuration, it is configured in such a way that the substantially L-shaped bent portion 37 disposed at the first end portion 24a of the spring member 24, is inserted into the locking hole 36 formed to the box-shaped portion 35 of the holder 13.

As illustrated in FIG. 4, the arm 12 of the embodiment includes, at the rear end portion 12r thereof, an engaging recessed portion 45 with which the shaft-shaped projecting portions 32 disposed to the holder 13 as described above engage. Specifically, the arm 12 of the embodiment is set in an attitude substantially orthogonal to the holder 13 and assembled to the holder 13. The assembling of the arm 12 to the holder 13 is carried out with the spring member 24 being locked to the holder 13. Further, on this occasion, the engaging recessed portion 45 of the embodiment has an opening portion through which the above-described shaft-shaped projecting portions 32 are inserted into the inside of the engaging recessed portion 45. The deflector device 11 of the embodiment is configured in such a way that rotating the arm 12 assembled to the holder 13 in the retraction direction with this configuration and thereby bending the spring member 24 interposed between the arm 12 and the holder 13 generate a biasing force in a direction in which the deflector 10 supported by the arms 12 is spread.

Figure 6:
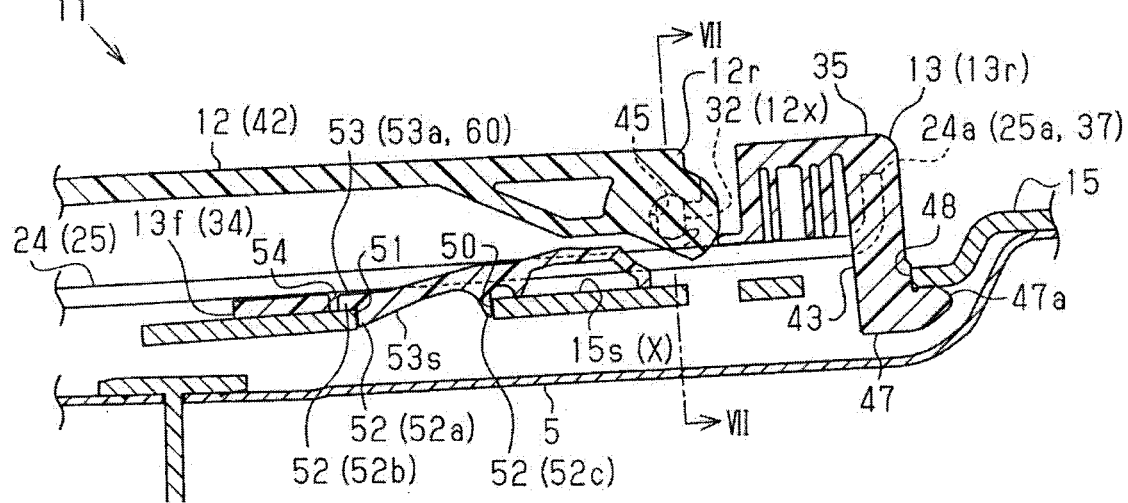
FIG. 6 is another cross-sectional view of the deflector device (a cross-sectional view taken along a line VI-VI in FIG. 2)
Figure 7:
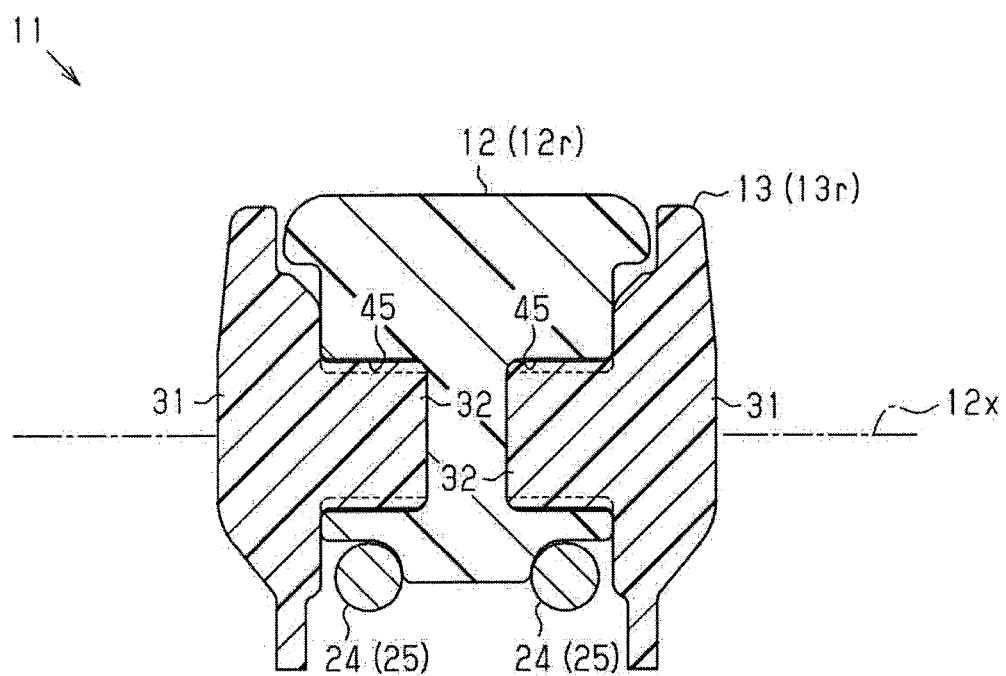
FIG. 7 is still another cross-sectional view of the deflector device (a cross-sectional view taken along a line VII-VII in FIG. 6)

Further more specifically, as illustrated in FIGS. 5A, 5B, and 6, the holder 13 of the embodiment includes, at a rear end portion 13r at which the box-shaped portion 35 with which the first end portion 24a of the spring member 24 is engaged is disposed as described above, an engaging hook 47 that projects to the underside surface 34b side of the bottom wall portion 34. Specifically, the engaging hook 47 has a substantially L-shaped bent shape a tip portion 47a of which extends to the opposite side to the extending direction of the arm 12 supported by the holder 13. Further, the base member 15 includes a substantially planar support surface 15s on which the bottom wall portion 34 of the holder 13 is fixed. The holder 13 of the embodiment is configured to be assembled to the base member 15 in such a way as to have the engaging hook 47 being inserted into a mounting hole 48 formed on the support surface 15s serving as a fixing position X.

The base member 15 of the embodiment also includes a mounting hole 50 formed on the support surface 15s, on the vehicle front side (see FIG. 2, a left side in FIG. 2) further than the mounting hole 48 into which the engaging hook 47 is inserted. The holder 13 of the embodiment includes an engaging piece 53 that has a claw portion 52 engaging with an edge portion 51 of the mounting hole 50.

More specifically, to the bottom wall portion 34 of the holder 13 fixed to the support surface 15s of the base member 15, a hole portion 54 that opens over the mounting hole 50 formed to the support surface 15s is disposed. The hole portion 54 is formed in a vicinity of a front end portion 13f of the holder 13. Further, the hole portion 54 has a substantially T-shaped hole shape that has a wide width portion 54a on the front side (a left side in FIGS. 5A, 5B, and 6). The engaging piece 53 of the embodiment is disposed in such a way as to project to the inside of the hole portion 54.

Specifically, the engaging piece 53 extends from the rear side toward the front side of the hole portion 54. The engaging piece 53 has a shape curving downward in order that a tip portion 53a thereof is arranged inside the hole portion 54. Further, the engaging piece 53 includes bifurcated claw portions 52a and 52b disposed at the tip portion 53a. The holder 13 of the embodiment is configured to be fixed to the support surface 15s of the base member 15 with the claw portions 52a and 52b engaging with a front edge portion 51f of the mounting hole 50.

Figure 8:
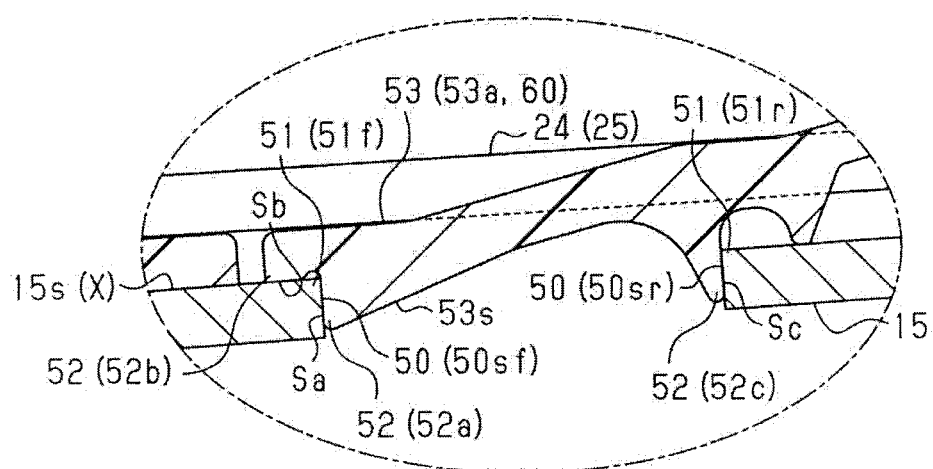
FIG. 8 is an enlarged cross-sectional view of a claw portion disposed to an engaging piece.

Further more specifically, as illustrated in FIG. 8, in the engaging piece 53 of the embodiment, the claw portion 52a is disposed in such a way as to project downward from the tip portion 53a of the engaging piece 53. The claw portion 52b is disposed in such a way as to project frontward from the tip portion 53a of the engaging piece 53. Further, the claw portions 52a and 52b have the bifurcated shapes forming engaging surfaces Sa and Sb that are substantially orthogonal to each other, respectively. The engaging piece 53 of the embodiment is configured to have the two claw portions 52a and 52b engaging with the front edge portion 51f of the mounting hole 50 in such a way that the engaging surfaces Sa and Sb are pressed against a front side surface 50sf of the mounting hole 50 and the support surface 15s of the base member 15 to which the mounting hole 50 is formed, respectively.

The engaging piece 53 of the embodiment includes, in the rear of the claw portion 52a, a claw portion 52c that projects downward therefrom. Further, the claw portion 52c is inserted into the mounting hole 50 and thereby forms an engaging surface Sc that engages with a rear side surface 50sr of the mounting hole 50. The engaging piece 53 of the embodiment is configured to have the claw portion 52c thereof engaging with a rear edge portion 51r of the mounting hole 50 in such a way that the engaging surface Sc is pressed against the rear side surface 50sr of the mounting hole 50.

Further, the engaging piece 53 of the embodiment is formed in one body with the claw portion 52a and thereby has an inclined surface 53s that projects downward from the tip portion 53a of the engaging piece 53 and extends along an extending direction of the engaging piece 53. The holder 13 of the embodiment is configured to be assembled to the base member 15 in such a way that, while the inclined surface 53s disposed to the engaging piece 53 of the holder 13 is in sliding contact with the front edge portion 51f of the mounting hole 50, the claw portion 52a disposed to the tip portion 53a of the engaging piece 53 is inserted into the mounting hole 50.

In other words, the engaging piece 53 of the embodiment is configured to have a shape, the tip portion 53a side of which curves downward, bending on this occasion. The holder 13 of the embodiment is configured in such a way that, based on an elastic force generated on the engaging piece 53 because of the bending, the claw portions 52a to 52c elastically engage with the edge portion 51 of the mounting hole 50.

Specifically, the engaging piece 53 of the embodiment has the claw portions 52a and 52b disposed to the tip portion 53a thereof, being pressed against the front edge portion 51f of the mounting hole 50. The engaging piece 53 is also configured to have the claw portion 52c disposed in the rear of the claw portions 52a and 52b, being pressed against the rear edge portion 51r of the mounting hole 50.

Further more specifically, in the deflector device 11 of the embodiment, when the holder 13 is assembled to the base member 15, the engaging hook 47 disposed to the rear end portion 13r of the holder 13 is first inserted into the mounting hole 48 of the base member 15, as illustrated in FIG. 6. Next, the holder 13 is moved rearward while the bottom wall portion 34 of the holder 13 is put in contact with the support surface 15s of the base member 15. Further, the rearward movement of the holder 13 causes the above-described claw portions 52a and 52c disposed to the engaging piece 53 of the holder 13, to be inserted into the mounting hole 50 of the base member 15. With this operation, the holder 13 of the embodiment is configured to be fixed to the support surface 15s of the base member 15 while the engaging hook 47 disposed to the rear end portion 13r of the holder 13 is in a state of engaging with the mounting hole 48 and, therewith, the claw portions 52a to 52c disposed to the engaging piece 53 of the holder 13 are in a state of engaging with the edge portions 51 (51f and 51r) of the mounting hole 50.

As illustrated in FIG. 5A, the engaging piece 53 of the embodiment has the tip portion 53a of the engaging piece 53, which extends in the extending direction of the arm 12 supported by the holder 13, being formed into a wide shape portion 55 that has a pair of extended portions 55a projecting toward both sides in the width direction of the engaging piece 53.

Figure 9:
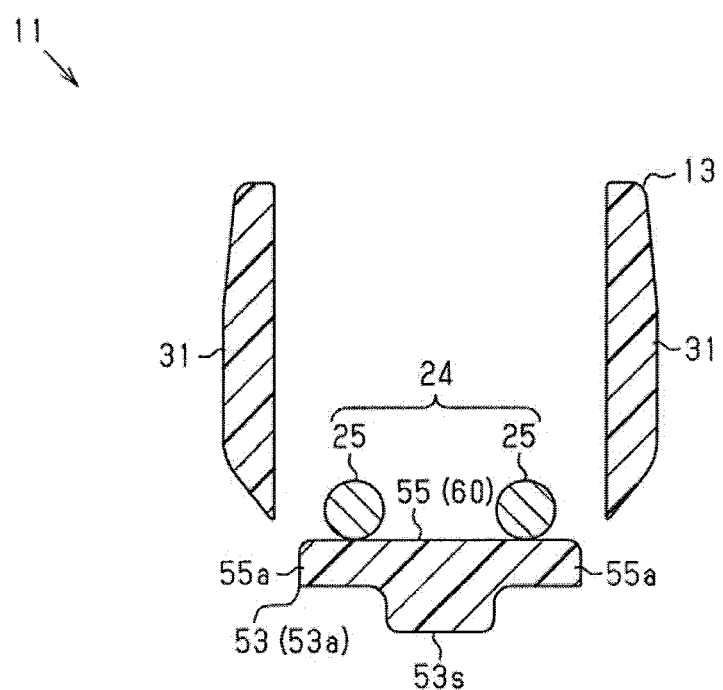
FIG. 9 is still another cross-sectional view of the deflector device (a cross-sectional view taken along a line VIII-VIII in FIG. 5A).

As illustrated in FIG. 9, the spring member 24 of the embodiment is configured in such a way that the first end portion 24a thereof being locked to the rear end portion 13r of the holder 13 causes the two wire spring portions 25 arranged substantially in parallel with each other along the bottom wall portion 34 of the holder 13, to be arranged on the upper surfaces of the respective extended portions 55a disposed to the tip portion 53a of the engaging piece 53. Further, the engaging piece 53 of the embodiment is configured in such a way that rotation biasing of the arm 12 by the spring member 24 assembled to the holder 13 causes the two wire spring portions 25 of the spring member 24 to press the extended portions 55a downward (toward a lower side in FIG. 9). With this configuration, the holder 13 of the embodiment is configured to reinforce engagement states of the claw portions 52a to 52c of the engaging piece 53 with the edge portions 51 of the mounting hole 50 formed to the base member 15.

That is, in the deflector device 11 of the embodiment, the spring member 24, which is interposed between the arm 12 and the holder 13 and thereby presses the holder 13, pushes down the engaging piece 53, by using both extended portions 55a, which constitute the wide shape portion 55 disposed to the tip portion 53a of the engaging piece 53, as pressed portions 60. In other words, the pressed portions 60 are configured in such a way that the above-described pair of wire spring portions 25 are pressed against the pressed portions 60 from above at two positions on both sides in the width direction sandwiching a middle position in the width direction at which the claw portions 52 are disposed (see FIG. 5). As a result, the claw portions 52a to 52c disposed to the engaging piece 53 are caused to be pressed to the edge portions 51 (51f and 51r) of the mounting hole 50 more strongly. With this configuration, the deflector device 11 of the embodiment is configured to fix the holder 13 to the support surface 15s of the base member 15 more surely.

Next, advantageous effects of the embodiment will be explained.

(1) The deflector device 11 includes the deflector 10 arranged at the front edge portion 3f of the roof opening portion 3, the arms 12 supporting the deflector 10, the holders 13 rotatably supporting the arms 12, and the spring members 24 each of which is interposed between the holder 13 and the arm 12 and thereby rotationally biases the arm 12 in a direction in which the deflector 10 is spread. To the holder 13, the engaging piece 53 that has the claw portions 52 (52a to 52c) engaging with the edge portions 51 (51f and 51r) of the mounting hole 50 formed to the fixing position X (the support surface 15s of the base member 15) to which the holder 13 is fixed, is disposed. To the engaging piece 53, the pressed portions 60 against which the spring member 24 which presses the holder 13 is pressed and that thereby reinforce engagement states of the claw portions 52 with the edge portions 51 of the mounting hole 50 are disposed.

The configuration described above enables the holder 13 to be easily placed at the fixing position X in such a way as to engage the claw portions 52 of the engaging piece 53 with the mounting hole 50. The holder 13 forming a rotation fulcrum of the arm 12 enables assembling work of the arm 12 to be facilitated.

Further, the spring member 24 which rotationally biases the arm 12 in such a way as to press the holder 13, by pressing the pressed portions 60 disposed to the engaging piece 53, causes engagement states of the claw portions 52 with the mounting hole 50 to be reinforced. As a result, even when, for example, an external force is applied to the deflector 10, a state in which the claw portions 52 of the engaging piece 53 engage with the mounting hole 50 is maintained in the holder 13 supporting the arm 12 of the deflector 10. Because of this capability, it is possible to secure an easy-to-assemble and stable fixation state with a simple configuration.

(2) The spring member 24 includes a pair of wire spring portions 25 extending in the extending direction of the arm 12. The pressed portions 60 of the engaging piece 53 are configured in such a way that the above-described pair of wire spring portions 25 are pressed against the pressed portions 60 at two positions sandwiching a position at which the claw portions 52 are disposed.

The configuration described above enables a state in which the pressed portions 60 are pressed by the spring member 24, to be formed in a well-balanced and stable manner and therewith enables a pressing force of the spring member 24 to be efficiently transmitted to the claw portions 52. Because of this capability, it is possible to effectively reinforce the engagement states of the claw portions 52 with the mounting hole 50.

(3) The engaging piece 53 is extended in the extending direction of the arm 12. The pressed portions 60 are configured as the wide shape portion 55 that has a pair of the extended portions 55a which project toward both sides in the width direction of the engaging piece 53.

The configuration described above enables the respective wire spring portions 25 to be pressed against the extended portions 55a of the wide shape portion 55 which constitutes the pressed portions 60, at two positions on both sides in the width direction sandwiching a position at which the claw portions 52 are disposed. Because of this capability, it is possible to more effectively reinforce the engagement states of the claw portions 52 with the mounting hole 50.

(4) The engaging piece 53 has the claw portions 52a and 52c that are inserted into the mounting hole 50. The pressed portions 60 of the engaging piece 53 are configured in such a way that the spring member 24 is pressed against the pressed portions 60 at a position at which the claw portions 52a and 52c are inserted into the mounting hole 50.

The configuration described above enables the claw portions 52a and 52c disposed to the engaging piece 53 to be inserted into the mounting hole 50 more strongly, based on a force with which the spring member 24 presses the pressed portions 60. Because of this capability, it is possible to effectively reinforce the engagement states of the claw portions 52 with the mounting hole 50.

(5) The engaging piece 53 is configured in such a way that, based on an elastic force of the engaging piece 53, the claw portions 52 elastically engage with the edge portions 51 of the mounting hole 50.

The configuration described above enables the claw portions 52 to engage with the edge portions 51 of the mounting hole 50 in a stable manner. Further, it is possible to cause the claw portions 52 to engage with the edge portions 51 of the mounting hole 50 more strongly, based on a force with which the spring member 24 presses the engaging piece 53. Because of this capability, it is possible to effectively reinforce the engagement states of the claw portions 52 with the mounting hole 50.

(6) The engaging piece 53 includes the claw portions 52 (52a and 52b) disposed at the tip portion 53a of the engaging piece 53. The configuration described above enables the claw portions 52 (52a and 52b) to surely engage with the edge portions 51 of the mounting hole 50 and therewith enables a pressing force of the spring member 24 to be efficiently transmitted to the claw portions 52.

Note that the embodiment described above may be embodied by being modified as follows. The embodiment described above and the following modifications may be embodied by being combined with one another as long as they do not technically contradict one another.

In the embodiment described above, it is assumed that the support surface 15s of the base member 15 disposed to the guide rail 5 is set as the fixing position X for the holder 13. However, without being limited to the above, the fixing position X for the holder 13 may be set in any manner as long as the configuration of the base member 15 allows the mounting hole 50 with which the claw portions 52 of the engaging piece 53 disposed to the holder 13 can engage, to be formed. For example, it may be configured in such a way that the base member 15 is disposed to a portion other than the guide rail 5. It may also be configured in such a way that the mounting hole 50 is formed directly to the guide rail 5. Alternatively, it may be configured in such a way that a portion other than the guide rail 5 is set as the fixing position X for the holder 13 and the mounting hole 50 is formed to the portion.

In the embodiment described above, the spring member 24 is configured including a pair of the wire spring portions 25 that are formed by bending a wire rod into two. It is assumed that the pressed portions 60 of the engaging piece 53 are configured in such a way that the above-described pair of wire spring portions 25 are pressed against the pressed portions 60 at two positions sandwiching a position at which the claw portions 52 are disposed. However, without being limited to the above, a shape of the spring member 24 and a mode in which the spring member 24 is interposed between the arm 12 and the holder 13 may be modified in any manner. For example, the spring member 24 may have a configuration including a plate spring portion in place of the two wire spring portions 25. It may be configured that the plate spring portion is pressed against a position at which the claw portions 52 are disposed (for example, just above the claw portions 52).

Further, a shape of the engaging piece 53 may also be modified in any manner. In addition, the number and shapes of the claw portions 52 may also be modified in any manner. That is, in the embodiment described above, the engaging piece 53 extends frontward from a rear side of the hole portion 54 formed to the bottom wall portion 34 of the holder 13. The engaging piece 53 is assumed to include the claw portions 52 (52a and 52b) disposed at the tip portion 53a of the engaging piece 53. However, without being limited to the above, it may be configured in such a way that, for example, the engaging piece 53 extends rearward from the front side along the extending direction of the arm 12.

Although, in the embodiment described above, it is assumed that the arms 12 extend from both end portions in the longitudinal direction of the deflector 10 toward the vehicle rear side, the extending direction may be modified in any manner. In addition, shapes of the arms 12 may also be modified in any manner.

Further, to any use other than the deflector device 11, the fixing structure fixing the holders 13 to the fixing positions X may be applied. That is, in this case, rotating members that are rotatably supported by the holders 13 are not limited to the arms 12 of the deflector 10. In addition, any type of rotation biasing device may be used as long as rotationally biasing the rotating members by means of the spring members 24 interposed between the rotating members and the holders 13.

In the embodiment described above, the deflector 10 is configured including the lower frame 21 fixed to the front edge portion 3f of the roof opening portion 3, the upper frame 22 formed in one body with the arms 12, and the belt-shaped mesh member 23 hung between the upper frame 22 and the lower frame 21. It is assumed that the mesh member 23 is spread in such a way that rotation of the arms 12 causes the upper frame 22 to pull out the mesh member 23 upward. However, without being limited to the above, the deflector 10 does not always have to have a folding structure. For example, the deflector 10 may be simply configured to be spread by upward movement and to be retracted by downward movement.

Next, a technological concept that can be understood from the embodiment and modifications described above will be described.

(A) A deflector device configured in such a way that the engaging piece has a claw portion disposed to a tip portion of the engaging piece. With this configuration, it is possible to cause the claw portion to surely engage with an edge portion of a mounting hole and therewith efficiently transmit a pressing force of a spring member to the claw portion.

(1) A deflector device includes a deflector arranged at a front edge portion of an opening portion disposed to a roof of a vehicle, an arm that supports the deflector, a holder that rotatably supports the arm, and a spring member that is interposed between the holder and the arm and thereby rotationally biases the arm in a direction in which the deflector is spread at a front edge portion of the opening portion. An engaging piece that has a claw portion engaging with an edge portion of a mounting hole formed at a fixing position at which the holder is fixed is disposed to the holder, and a pressed portion against which the spring member pressing the holder is pressed and that thereby reinforces an engagement state of the claw portion with an edge portion of the mounting hole is disposed to the engaging piece.

The configuration described above enables the holder to be easily placed at the fixing position in such a way as to engage the claw portion of the engaging piece with the mounting hole. The holder forming a rotation fulcrum of the arm enables assembling work of the arm to be facilitated.

Further, the spring member which rotationally biases the arm in such a way as to press the holder, by pressing the pressed portion disposed to the engaging piece, causes an engagement state of the claw portion with the mounting hole to be reinforced. As a result, even when, for example, an external force is applied to the deflector, a state in which the claw portion of the engaging piece engages with the edge portion of the mounting hole is maintained in the holder supporting the arm of the deflector. Because of this capability, it is possible to secure an easy-to-assemble and stable fixation state with a simple configuration.

(2) In the deflector device according to the item (1), the spring member may be configured to include a pair of wire spring portions extending in an extending direction of the arm, and the pressed portion may be configured in such a way that the pair of wire spring portions are pressed against the pressed portion at two positions sandwiching a position at which the claw portion is disposed.

The configuration described above enables a state in which the pressed portion is pressed by the spring member, to be formed in a well-balanced and stable manner and therewith enables a pressing force of the spring member to be efficiently transmitted to the claw portion. Because of this capability, it is possible to effectively reinforce the engagement state of the claw portion with the mounting hole.

(3) In the deflector device according to the item (2), the engaging piece may be configured to be extended in an extending direction of the arm, and the pressed portion may be configured to be formed in a wide shape that has a pair of extended portions projecting toward both sides in a width direction of the engaging piece.

The configuration described above enables the wire spring portions to be pressed against the respective extended portions of the wide shape portion which constitutes the pressed portion, at two positions on both sides in the width direction sandwiching a position at which the claw portion is disposed. Because of this capability, it is possible to more effectively reinforce the engagement state of the claw portion with the mounting hole.

(4) In the deflector device according to the items (1) to (3), the engaging piece may be configured to have the claw portion to be inserted into the mounting hole, and the pressed portion may be configured in such a way that the spring portion is pressed against the pressed portion at a position at which the claw portion is inserted into the mounting hole.

The configuration described above enables the claw portion disposed to the engaging piece to be inserted into the mounting hole more strongly, based on a pressing force of the spring member. Because of this capability, it is possible to effectively reinforce the engagement state of the claw portion with the mounting hole.

(5) In the deflector device according to the items (1) to (4), the engaging piece may be configured in such a way that, based on an elastic force of the engaging piece, the claw portion elastically engages with the edge portion of the mounting hole.

The configuration described above enables the claw portion to engage with the edge portion of the mounting hole in a stable manner. Further, it is possible to cause the claw portion to engage with the edge portion of the mounting hole more strongly, based on a force with which the spring member presses the engaging piece. Because of this capability, it is possible to effectively reinforce the engagement state of the claw portion with the mounting hole.

(6) In the deflector device according to the item (1), the engaging piece may be configured to have a claw portion disposed to a tip portion of the engaging piece.

The configuration described above enables the claw portion to surely engage with the edge portion of the mounting hole and therewith enables a pressing force of the spring member to be efficiently transmitted to the claw portion.

(7) A rotation biasing device includes a holder that supports a rotating member and a spring member that is interposed between the holder and the rotating member and thereby rotationally biases the rotating member. An engaging piece that has a claw portion engaging with an edge portion of a mounting hole formed at a fixing position at which the holder is fixed is disposed to the holder, and a pressed portion against which the spring member pressing the holder is pressed and that thereby reinforces an engagement state of the claw portion with an edge portion of the mounting hole is disposed to the engaging piece.

The configuration described above enables the holder to be easily placed at the fixing position in such a way as to engage the claw portion of the engaging piece with the mounting hole. The holder forming a rotation fulcrum of the rotating member enables assembling work of the rotating member to be facilitated. Further, the spring member which biases the rotating member in such a way as to press the holder, by pressing the pressed portion disposed to the engaging piece, causes an engagement state of the claw portion with the mounting hole to be reinforced. Because of this capability, it is possible to secure an easy-to-assemble and stable fixation state with a simple configuration.

(8) In the rotation biasing device according to the item (7), the engaging piece may be configured to have a claw portion disposed to a tip portion of the engaging piece.

The configuration described above enables the claw portion to surely engage with the edge portion of the mounting hole and therewith enables a pressing force of the spring member to be efficiently transmitted to the claw portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A deflector device comprising:
a deflector arranged at a front edge portion of an opening portion disposed in a roof of a vehicle;
an arm that supports the deflector;
a holder that rotatably supports the arm; and
a spring member that is interposed between the holder and the arm and thereby rotationally biases the arm in a direction in which the deflector is spread at the front edge portion of the opening portion, wherein
an engaging piece that has a claw portion engaging with an edge portion of a mounting hole of a base member formed at a fixing position at which the holder is fixed is disposed with respect to the holder, and
a pressed portion of the engaging piece against which the spring member pressing the holder is pressed and that thereby reinforces an engagement state of the claw portion with the edge portion of the mounting hole is disposed with respect to the engaging piece.

2. The deflector device according to claim 1, wherein the spring member includes a pair of wire spring portions extending in an extending direction of the arm, and the pressed portion is configured in such a way that the pair of wire spring portions are pressed against the pressed portion at two positions sandwiching a position at which the claw portion is disposed.

3. The deflector device according to claim 2, wherein the engaging piece is extended in an extending direction of the arm, and the pressed portion is formed in a wide shape that has a pair of extended portions projecting toward both sides in a width direction of the engaging piece.

4. The deflector device according to claim 1, wherein the engaging piece has the claw portion to be inserted into the mounting hole, and the pressed portion is configured in such a way that the spring member is pressed against the pressed portion at a position at which the claw portion is inserted into the mounting hole.

5. The deflector device according to claim 2, wherein the engaging piece has the claw portion to be inserted into the mounting hole, and the pressed portion is configured in such a way that the spring member is pressed against the pressed portion at a position at which the claw portion is inserted into the mounting hole.

6. The deflector device according to claim 3, wherein the engaging piece has the claw portion to be inserted into the mounting hole, and the pressed portion is configured in such a way that the spring member is pressed against the pressed portion at a position at which the claw portion is inserted into the mounting hole.

7. The deflector device according to claim 1, wherein the engaging piece is configured in such a way that, based on an elastic force of the engaging piece, the claw portion elastically engages with the edge portion of the mounting hole.

8. The deflector device according to claim 2, wherein the engaging piece is configured in such a way that, based on an elastic force of the engaging piece, the claw portion elastically engages with the edge portion of the mounting hole.

9. The deflector device according to claim 3, wherein the engaging piece is configured in such a way that, based on an elastic force of the engaging piece, the claw portion elastically engages with the edge portion of the mounting hole.

10. The deflector device according to claim 4, wherein the engaging piece is configured in such a way that, based on an elastic force of the engaging piece, the claw portion elastically engages with the edge portion of the mounting hole.

11. The deflector device according to claim 1, wherein the engaging piece has the claw portion disposed at a tip portion of the engaging piece.

12. A rotation biasing device comprising:
a holder that supports a rotating member; and
a spring member that is interposed between the holder and the rotating member and thereby rotationally biases the rotating member, wherein
an engaging piece that has a claw portion engaging with an edge portion of a mounting hole of a base member formed at a fixing position at which the holder is fixed is disposed with respect to the holder, and
a pressed portion of the engaging piece against which the spring member pressing the holder is pressed and that thereby reinforces an engagement state of the claw portion with the edge portion of the mounting hole is disposed with respect to the engaging piece.

13. The rotation biasing device according to claim 12, wherein the engaging piece has the claw portion disposed at a tip portion of the engaging piece.

* * * * *